US012128649B2

(12) United States Patent
Reichardt

(10) Patent No.: US 12,128,649 B2
(45) Date of Patent: Oct. 29, 2024

(54) LAMINATED GLASS PANE FOR A VEHICLE

(71) Applicant: Audi AG, Ingolstadt (DE)

(72) Inventor: Lars Reichardt, Wettstetten (DE)

(73) Assignee: AUDI AG, Ingolstadt (DE)

( * ) Notice: Subject to any disclaimer, the term of this patent is extended or adjusted under 35 U.S.C. 154(b) by 657 days.

(21) Appl. No.: 16/626,651

(22) PCT Filed: Jun. 15, 2018

(86) PCT No.: PCT/EP2018/065924
§ 371 (c)(1),
(2) Date: Dec. 26, 2019

(87) PCT Pub. No.: WO2019/001988
PCT Pub. Date: Jan. 3, 2019

(65) Prior Publication Data
US 2020/0122434 A1    Apr. 23, 2020

(30) Foreign Application Priority Data

Jun. 28, 2017    (DE) .................... 10 2017 210 989.0

(51) Int. Cl.
*B32B 17/10*    (2006.01)
*B60J 1/02*    (2006.01)
*H01Q 1/32*    (2006.01)

(52) U.S. Cl.
CPC .. *B32B 17/10036* (2013.01); *B32B 17/10174* (2013.01); *B32B 17/10339* (2013.01);
(Continued)

(58) Field of Classification Search
CPC ........ B32B 17/10036; B32B 17/10174; B32B 17/10339; B32B 2605/006;
(Continued)

(56) References Cited

U.S. PATENT DOCUMENTS 6,275,157 B1 *    8/2001    Mays .................... G07C 5/085
                                                    340/572.5
10,099,451 B2    10/2018    Keller
(Continued)

FOREIGN PATENT DOCUMENTS

CN    1511356 A    7/2004
CN    101848810 A    9/2010
(Continued)

OTHER PUBLICATIONS

Machine Translation of DE 3724014 A1 (Year: 1988).*
(Continued)

*Primary Examiner* — Brian Handville
(74) *Attorney, Agent, or Firm* — Sterne, Kessler, Goldstein & Fox P.L.L.C.

(57) ABSTRACT

A laminated glass pane, such as a front pane for a motor vehicle, includes at least two glass layers including a first glass layer and a second glass layer. The laminated glass pane includes a film disposed between the first and second glass layers. The laminated glass pane includes a metallic layer disposed on the first glass layer or the second glass layer, in which the metallic layer includes a recess. The laminated glass plane includes a first black print grid at least partially covering the recess of the metallic layer. The laminated glass plane includes an antenna structure disposed between the first and second glass layers, in which the antenna structure is covered by the first black print grid.

10 Claims, 3 Drawing Sheets

(52) U.S. Cl.
CPC .......... *B32B 2605/006* (2013.01); *B60J 1/02* (2013.01); *H01Q 1/325* (2013.01)

(58) Field of Classification Search
CPC .......... B32B 17/1022; B32B 17/10266; B32B 17/00; B60J 1/02; H01Q 1/325
See application file for complete search history.

(56) References Cited

U.S. PATENT DOCUMENTS

| | | |
|---|---|---|
| 2006/0126196 A1 | 6/2006 | Crumbach et al. |
| 2007/0152895 A1 | 7/2007 | Heuser et al. |
| 2010/0085261 A1* | 4/2010 | Baranski ........... B32B 17/10018 343/713 |
| 2010/0255238 A1 | 10/2010 | Derda |
| 2011/0279335 A1* | 11/2011 | Degen ............... B32B 17/10348 343/705 |
| 2014/0266931 A1 | 9/2014 | Shkembi |
| 2016/0006112 A1 | 1/2016 | Kagaya et al. |
| 2016/0263866 A1* | 9/2016 | Keller ............... B32B 17/10201 |
| 2018/0037006 A1* | 2/2018 | Droste ............. B32B 17/10183 |
| 2020/0079057 A1* | 3/2020 | Null ................. B32B 17/10788 |

FOREIGN PATENT DOCUMENTS

| | | |
|---|---|---|
| CN | 105075009 A | 11/2015 |
| CN | 1709009 A | 12/2015 |
| DE | 3724014 A1 | 7/1988 |
| DE | 19852184 A | 5/2000 |
| DE | 10323557 B3 | 7/2004 |
| DE | 102010039709 A1 | 1/2012 |
| DE | 102012010694 A1 | 11/2012 |
| EP | 2878442 A1 | 6/2015 |
| WO | WO 2002/035646 A1 | 5/2002 |
| WO | WO-2015078989 A1 * | 6/2015 ....... B32B 17/10036 |

OTHER PUBLICATIONS

International Preliminary Report on Patentability directed to related International Patent Application No. PCT/EP2018/065924, mailed Jul. 10, 2019, with attached English-language translation; 9 pages.
International Search Report and Written Opinion of the International Searching Authority directed to related International Patent Application No. PCT/EP2018/065924, mailed Sep. 24, 2018, with attached English-language translation; 15 pages.

* cited by examiner

LAMINATED GLASS PANE FOR A VEHICLE

TECHNICAL FIELD

The present invention relates to a laminated glass pane, in particular a front pane for a motor vehicle, in which an antenna structure is integrated into the laminated glass pane so as not to be optically perceptible by a driver and an observer present outside the vehicle.

BACKGROUND

Increasing networking of vehicles is creating new demands on wireless technologies for transmitting wireless information. For example, a WLAN antenna must be able to cover an interior space and a vehicle exterior space for a variety of vehicles. In particular when a WLAN antenna is attached in the region of a front pane of the vehicle, the metallic coatings of the glass pane produce attenuations of the transmission signal in the space outside the vehicle. In the region of the mirror base plate bracket, there is often a recess in the metallization of the front pane on vehicles. This allows an antenna introduced into the mirror base plate bracket to cover an exterior space of the vehicle. Various possibilities have been proposed for mounting an antenna in the region of the front pane of a vehicle.

DE 103 23 557 B3 discloses a vehicle antenna for a vehicle window, wherein the glass pane has a grey print region and a black print region and the vehicle antenna is externally mounted on the vehicle window in the grey print region of the vehicle window such that it is covered by a region of the grey print region provided with a recess.

DE10 2012 010 694 A1 discloses an antenna arrangement for vehicles having a non-conductive window frame, in which the antenna arrangement is implemented by a black print grid in the side region of a vehicle window. The antenna is arranged visibly. An electrical connection point is covered by a black print grid.

DE10 2010 039 709 A1 describes an antenna module for a vehicle, which is arranged in a region between a front pane and a body part and uses this as a heat sink.

However, an impairment of the view through the front pane is problematic for the above options. An antenna can therefore be integrated, for example, in the mirror base plate bracket. However, since other sensors, such as infrared sensors or rain sensors, are also arranged in the mirror base plate bracket, the mirror base plate bracket must be made larger. Furthermore, a direct integration of an antenna in the mirror base plate bracket is problematic with regard to the electromagnetic compatibility of the adjacent components in mirror base plate bracket.

SUMMARY OF INVENTION

The object of the present invention is therefore to propose an antenna not visible to a driver and arranged in the region of a mirror base plate bracket of the front page.

A subject of the present invention is a laminated glass pane, in particular a front pane for a motor vehicle. The laminated glass pane has at least two glass layers, a film arranged between the two glass layers, and a metal layer with a recess arranged on the first or the second glass layer. Furthermore, the laminated glass pane has at least one first black print grid covering the recess of the metallic layer at least in some regions, the laminated glass pane having at least one antenna structure and the antenna structure being covered by the at least one black print grid.

As a result, an antenna can be integrated into the already existing black print grid of a front pane of a vehicle. The antenna may, for example, be a WLAN or Bluetooth antenna. The antenna may be applied to the black print grid or to the glass. This can be realized for example by gluing or printing. Preferably, the antenna is designed in the form of an electrically conductive layer and is adapted in its planar design to the black print grid. As a result, the black print grid can cover the antenna structure at least on one side, so that a driver cannot optically perceive the antenna structure. The antenna structure therefore does not have to be integrated in a mirror base plate, whereby the mirror base plate can be made smaller. In particular, the laminated glass pane according to an embodiment of the present invention makes it possible to equip smaller vehicles with a planar antenna structure in the region of the front page without restricting the field of vision of the driver. The film disposed between the first and second glass layers is a plastic film, such as PVB film, and serves to mechanically strengthen the laminated glass pane. The metallic layer or coating of the laminated glass pane can be, for example, an antireflection coating and, in the region of the mirror base plate bracket, has a recess for receiving the mirror base plate bracket. The recess of the metallic coating may have a planar extension corresponding to a planar extension of the mirror base plate bracket of a rear-view mirror. The at least one black print grid can be designed, for example, as a layer adjacent to the at least one antenna structure. Alternatively or additionally, a glass layer and/or the film layer may be arranged between the at least one antenna structure and the at least one black print grid. The at least one black print grid can be applied on both sides or on one side to a glass layer or to the film. In particular, the at least one black print grid can be positioned in the region of the mirror base plate bracket of the front pane and leave the recess free or partially cover it.

According to one embodiment of the present invention, the black print grid and the antenna structure are each designed as a hole pattern. Since the antenna structure has a flat shape adapted to the black print grid, the antenna structure can be completely overlaid by the black print grid. As a result, the antenna structure is no longer optically perceptible. Alternatively, the antenna structure in this case may be smaller than the black print grid and thus covered by an additional overlap of the black print grid. As a result, manufacturing tolerances can be compensated, so that the antenna structure is not visible even with minor deviations in its dimensions.

According to a further embodiment of the present invention, the antenna structure has an identical color to the black print grid. As a result, the antenna structure may also be concealed on one side only by a black print grid and yet be indistinguishable on both sides from a black print grid. Alternatively, the antenna structure may also assume the function of the black print grid, so that a black print grid can be omitted at least in some regions.

According to a further embodiment of the present invention, the antenna structure can be made transparent. In particular, the antenna structure may be in the form of thin wires or a thin layer. The antenna structure can be made so fine or thin that it is not perceptible to the driver.

According to a further embodiment of the present invention, the antenna structure is covered by a second black print grid. As a result, the antenna structure is overlaid on both sides and directly by a respective black print grid and concealed or covered on both sides. The antenna structure may be arranged together with the black print grids between the first and the second glass layer or on one side of the laminated glass pane. Alternatively, a first black print grid alone or together with the antenna structure between the first and the second glass layer and the second black print grid may be arranged on an outer surface of the laminated glass pane. At least one black print grid can in this case be applied on one side to the film arranged between the two glass layers. The antenna structure may be positioned between the black print grid and the film. The antenna structure can also be arranged on the surface of the film opposite the black print grid.

According to a further embodiment of the present invention, the second black print grid is applied directly to the antenna structure. As a result, the antenna structure can already be coated or overlaid in advance with the second black print grid. Subsequently, the antenna structure can be applied together with the second black print grid on the laminated glass pane. As a result, the assembly or arrangement of the antenna structure can be accelerated.

Furthermore, the second black print grid can be applied to the film arranged between the first and the second glass layer.

The film is preferably a PVB film for reducing the shattering risk of the laminated glass pane. In this case, the second black print grid can preferably be applied to the film together with the antenna structure. This can be realized as part of a manufacturing process of the laminated glass pane. Such an arrangement of the black print grid and the antenna structure between the glass layers, optimally protects the respective components of the laminated glass pane from external influences.

According to a further embodiment of the present invention, the antenna structure is printed on a surface of the at least one black print grid. The antenna structure may be designed, for example, in the form of an electrically conductive loop, a plurality of spaced-apart wires or in the form of at least one surface. The course of the antenna structure can be implemented as desired within or on the black print grid. By printing the antenna structure, even complicated shapes that can be used as antenna structures can be produced quickly and precisely. As the material for the antenna structure, for example, silver, copper, indium tin oxide and the like can be used. Alternatively, electrically conductive films can also be punched and applied to the laminated glass pane. Furthermore, the antenna structure can be vapor-deposited using masks on a glass layer or on a black print grid.

According to a further embodiment of the present invention, the antenna structure has a same shape and the same recesses as the black print grid. As a result, an antenna structure in the form of a hole pattern can be prepared in advance and then coated with a black print grid. The shape of the antenna structure predetermines the shape of the black print grid. Thus, the antenna structure and the black print grid can be technically easily realized.

According to a further embodiment of the present invention, the antenna structure and the at least one black print grid are arranged between the first and the second glass layer. As a result of this measure, the antenna structure can already be integrated into the laminated glass pane as part of a manufacturing process. Furthermore, the two glass layers form protective structures for the sensitive antenna structure.

According to a further embodiment of the present invention, the antenna structure and the at least one black print grid are arranged on an outer side of the first or the second glass layer. As a result, the black print grid and the antenna structure can also be subsequently applied to a laminated glass pane. The attachment can be done, for example, by applying an adhesive. As a result, an antenna structure in the form of a retrofit can be integrated into a vehicle.

According to a further embodiment of the present invention, the antenna structure has contacts in the form of pressings, soldering or gluing. In particular, connecting cables can thereby be connected to the antenna structure. The connection cables can be electrically connected via screw connections or plug-in connections to further electronics of the vehicle. This allows the antenna structure to be used to send and receive data.

Another object of the present invention is a method for producing a laminated glass according to an embodiment of the present invention. In this case, a first glass pane or glass layer is provided and a first black print grid applied thereto. Subsequently, for example thermally, a film is applied along the planar extension of the first glass layer. An antenna structure with a black print grid arranged on the antenna structure is positioned on the film. The laminated glass pane is completed by a second glass layer.

The manufacturing method makes it technically easy to introduce a large-area antenna structure into a laminated glass pane that is not perceptible to a driver or an observer outside the vehicle in accordance with its form adapted to a black print grid.

BRIEF DESCRIPTION OF THE FIGURES

In the drawings, the present invention is depicted schematically based on embodiments and is described in detail with reference to the drawings. In the drawings.

DETAILED DESCRIPTION OF THE FIGURES

Figure 1:
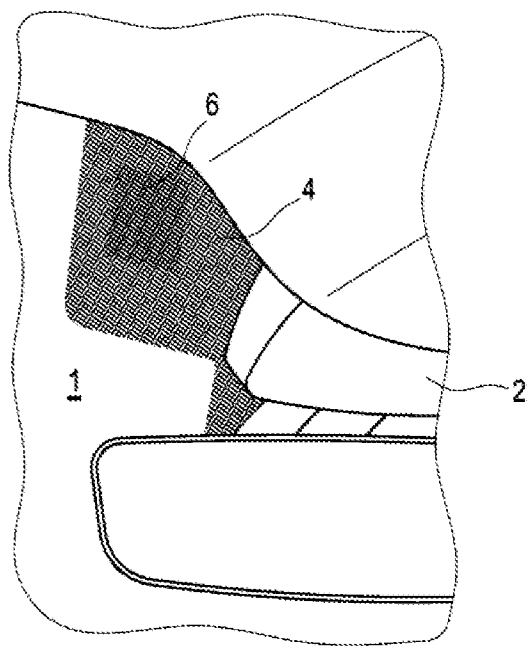
FIG. 1 shows a perspective view of a laminated glass pane according to an embodiment of the present invention in the region of the mirror base plate bracket according to an embodiment of the invention.

In the figures, the same structural elements each have the same reference numerals.

FIG. 1 shows a perspective view of a laminated glass pane 1 according to an embodiment of the present invention in the region of the mirror base plate bracket 2 according to a first embodiment of the present invention. The laminated glass pane 1 has a black print grid 4 in the region of the mirror base plate bracket 2. An antenna 6 or an antenna structure 6 is integrated in the black print grid 4. In FIG. 1, the antenna 6 is shown highlighted for clarity. In this case, the antenna structure 6 may have the same shape as the black print grid 4. By overlaying the black print grid 4 on the antenna structure 6, the antenna structure 6 can be concealed or covered. As a result, the antenna structure 6 arranged in the region of the mirror base plate bracket 2 on or in the laminated glass pane 1 is imperceptible, for example, to a driver.

Figure 2:
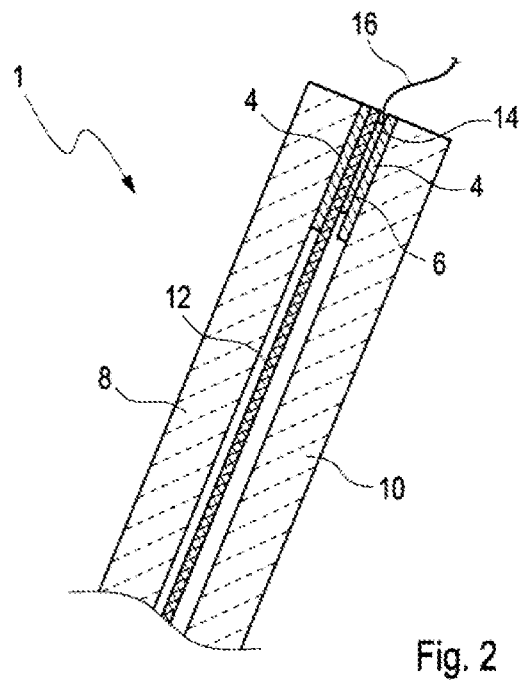
FIG. 2 shows a schematic cross section of a laminated glass pane according to an embodiment of the present invention.

FIG. 2 shows a schematic cross section of a laminated glass pane 1 according to a further embodiment of the present invention. Here, the laminated glass pane 1 is shown in the region of the mirror base plate bracket 2. According to the exemplary embodiment, a film 12 and an antenna structure 6 are arranged between a first glass layer 8 and a second glass layer 10 between two black print grids 4. The film 12 serves for mechanically reinforcing the laminated glass pane 1. The antenna structure 6 is here covered on both sides by a respective black print grid 4. For electrically connecting the antenna structure 6 to an electrical connection or line 16, the antenna structure 6 has at least one contact point 14. According to the exemplary embodiment, the black print grid 4 and the antenna structure 6 are protected on both sides by the first glass layer 8 and the second glass layer 10.

Figure 3:
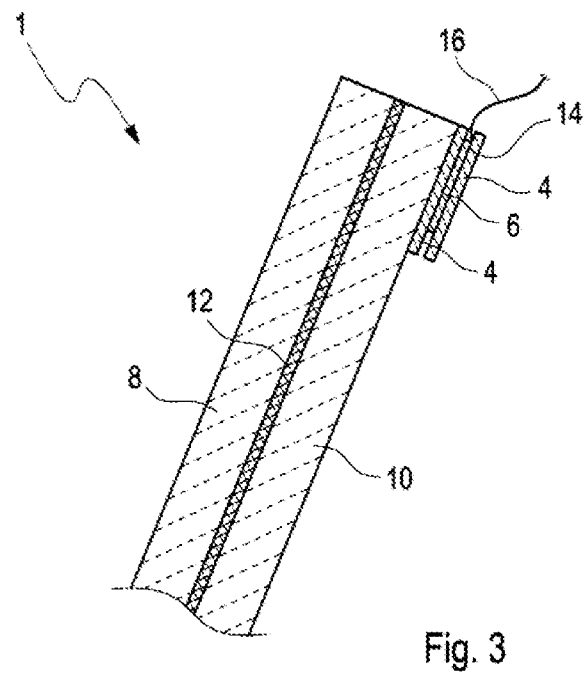
FIG. 3 shows a schematic cross section of a laminated glass pane according to a further embodiment of the present invention.

FIG. 3 shows a schematic cross section of a laminated glass pane 1 according to a further embodiment of the present invention. In contrast to the laminated glass pane 1 already shown in FIG. 2, the antenna structure 6 with the black print grids 4 arranged around the antenna structure 6 on both sides is not positioned between the two glass layers 8, 10 but on an outer surface of the second glass layer 10. In this way, a conventional laminated glass pane can be retrofitted with an antenna structure 6 concealed on both sides by a black-and-white print grid 4.

Figure 4:
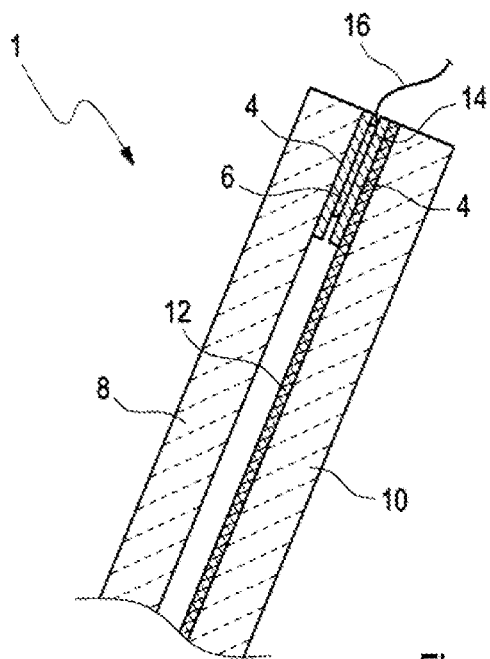
FIG. 4 shows a schematic cross section of a laminated glass pane according to a further embodiment of the present invention.

FIG. 4 shows a schematic cross section of a laminated glass pane 1 according to a further embodiment of the present invention. In contrast to the embodiments of the laminated glass pane 1 already shown, the antenna structure 6 concealed on both sides by a respective black print grid 4 is arranged here between the first glass layer 8 and the film 12. In this case, the respective black print grid 4 and the antenna structure 6 can be arranged between the first glass layer 8 and the second glass layer 10 in the context of a manufacturing process of the laminated glass pane 1.

Figure 5:
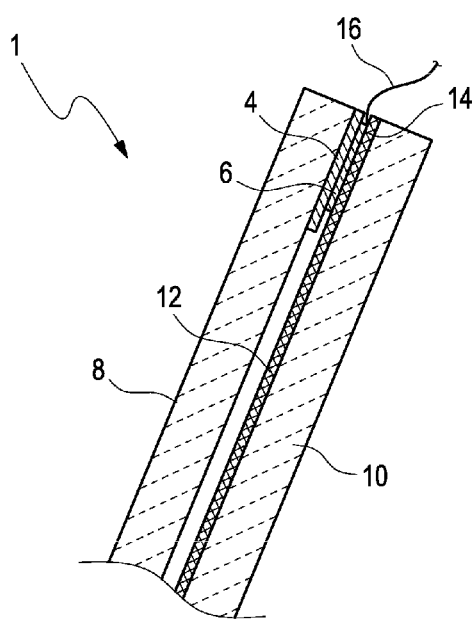
FIG. 5 shows a schematic cross section of a laminated glass pane according to a further embodiment of the present invention.

FIG. 5 shows a schematic cross section of a laminated glass pane 1 according to a further embodiment of the present invention. In contrast to the embodiment of the laminated glass pane 1 shown in FIG. 4, the antenna structure 6 in this case is only covered on one side by a black print grid 4. The antenna structure 6 is colored here with a color of the black print grid 4, so that the antenna structure 6 is imperceptible on both sides despite concealment on one side by a black print grid 4.

LIST OF REFERENCE NUMBERS

1 Laminated glass pane
2 Mirror base plate bracket
4 Black print grid
6 Antenna structure
8 First glass layer
10 Second glass layer
12 Film
14 Contact point
16 Electrical connection of the antenna structure

The invention claimed is:

1. A laminated glass pane for a motor vehicle, comprising:
   at least two glass layers including a first glass layer and a second glass layer;
   a film disposed between the first glass layer and the second glass layer;
   a metallic layer disposed on the first glass layer or the second glass layer, the metallic layer having a recess;
   a first black print grid disposed between the first glass layer and the second glass layer and at least partially covering the recess of the metallic layer;
   an antenna structure disposed between the first glass layer and the second glass layer, and the antenna structure is disposed on a first surface of the film and is printed on a surface of the first black print grid such that the antenna structure is covered by the first black print grid and the film is separated from at least one of the first glass layer and the second glass layer at the recess of the metallic layer by the antenna structure and the first black print grid; and
   a second black print grid applied to a second surface of the film disposed between the first glass layer and the second glass layer and overlaying the antenna structure such that the second black print grid conceals the antenna structure.

2. The laminated glass pane according to claim 1, wherein the first black print grid and the antenna structure each include a perforated grid.

3. The laminated glass pane according to claim 1, wherein the antenna structure has a color identical to the first black print grid.

4. The laminated glass pane according to claim 1, wherein the antenna structure is transparent.

5. The laminated glass pane according to claim 1, wherein the antenna structure has a shape identical to the first black print grid.

6. The laminated glass pane according to claim 1, wherein the antenna structure has contacts formed by pressing, soldering, or gluing.

7. The laminated glass plane according to claim 1, wherein the antenna structure comprises an electrically conductive loop.

8. The laminated glass plane according to claim 1, wherein the antenna structure comprises a planar-shaped electrically conductive layer.

9. The laminated glass plane according to claim 1, wherein the film is composed of a plastic material.

10. The laminated glass plane according to claim 9, wherein the plastic material includes polyvinyl butyral.

* * * * *